(12) United States Patent
Stieger et al.

(10) Patent No.: US 10,450,074 B2
(45) Date of Patent: Oct. 22, 2019

(54) AIRCRAFT PNEUMATIC SYSTEM

(71) Applicant: ROLLS-ROYCE plc, London (GB)

(72) Inventors: Rory D. Stieger, Derby (GB); Ivan Popovic, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/205,648

(22) Filed: Jul. 8, 2016

(65) Prior Publication Data
US 2017/0106985 A1 Apr. 20, 2017

(30) Foreign Application Priority Data

Aug. 7, 2015 (GB) .................................. 1513952.0

(51) Int. Cl.
*B64D 13/02* (2006.01)
*B64D 13/06* (2006.01)
(Continued)

(52) U.S. Cl.
CPC .............. *B64D 13/06* (2013.01); *B64D 13/02* (2013.01); *B64D 27/16* (2013.01); *B64D 41/00* (2013.01); *F01D 15/10* (2013.01); *F02C 3/13* (2013.01); *F02C 6/08* (2013.01); *F02C 7/08* (2013.01); *F02C 7/277* (2013.01); *F02C 9/18* (2013.01); *H02K 7/1823* (2013.01); *B64D 2013/0603* (2013.01); *B64D 2013/064* (2013.01);
(Continued)

(58) Field of Classification Search
CPC ............ B64D 2013/0648; B64D 13/02; B64D 13/06; B64D 24/02; B64D 41/00; F25B 2309/005; F25B 11/02; F02C 3/04; F02C 6/08; F02C 9/18; F02C 7/08; F02C 7/10; F01D 25/305; F01D 25/08
USPC ........................................ 60/39.511, 785, 782
See application file for complete search history.

(56) References Cited

U.S. PATENT DOCUMENTS 3,765,170 A * 10/1973 Nakamura .............. F02C 6/003
60/39.17
4,091,613 A * 5/1978 Young .................... B64D 41/00
417/88

(Continued)

FOREIGN PATENT DOCUMENTS

EP 0888966 A2 1/1999
EP 1752377 A2 2/2007
(Continued)

OTHER PUBLICATIONS

Dec. 15, 2016 Search Report issued in European Application No. 16 17 8641.
(Continued)

*Primary Examiner* — Frantz F Jules
*Assistant Examiner* — Lionel Nouketcha
(74) *Attorney, Agent, or Firm* — Oliff PLC (57) ABSTRACT

An aircraft pneumatic system includes a main gas turbine engine including a main compressor, a recuperated auxiliary gas turbine engine including a core compressor having an inlet in fluid communication with a main compressor bleed of the main gas turbine engine and an environmental control system inlet in fluid communication with the main compressor bleed of the main gas turbine engine. The environmental control system includes a compressor driveable by power provided by the auxiliary gas turbine engine.

16 Claims, 7 Drawing Sheets

(51) Int. Cl.
*F02C 6/08* (2006.01)
*F02C 7/08* (2006.01)
*F02C 7/277* (2006.01)
*B64D 27/16* (2006.01)
*B64D 41/00* (2006.01)
*F01D 15/10* (2006.01)
*F02C 3/13* (2006.01)
*F02C 9/18* (2006.01)
*H02K 7/18* (2006.01)

(52) U.S. Cl.
CPC ............. *B64D 2013/0611* (2013.01); *B64D 2013/0618* (2013.01); *B64D 2013/0644* (2013.01); *B64D 2013/0648* (2013.01); *F05D 2220/323* (2013.01); *F05D 2220/50* (2013.01); *F05D 2220/76* (2013.01); *Y02T 50/44* (2013.01); *Y02T 50/56* (2013.01); *Y02T 50/671* (2013.01)

(56) References Cited

U.S. PATENT DOCUMENTS

| | | | | |
|---|---|---|---|---|
| 5,442,905 | A * | 8/1995 | Claeys | B64D 13/06 454/71 |
| 6,526,775 | B1 * | 3/2003 | Asfia | B64D 13/06 62/401 |
| 7,171,819 | B2 * | 2/2007 | Lui | B64D 13/06 454/71 |
| 7,970,497 | B2 | 6/2011 | Derouineau et al. | |
| 2004/0211166 | A1 * | 10/2004 | Albero | F02C 7/277 60/226.1 |
| 2007/0220900 | A1 * | 9/2007 | Shockling | F02C 3/22 60/802 |
| 2007/0266695 | A1 * | 11/2007 | Lui | B64D 13/06 60/204 |
| 2011/0262269 | A1 * | 10/2011 | Lior | F01D 17/10 415/180 |
| 2013/0061611 | A1 | 3/2013 | Dittmar et al. | |
| 2013/0086927 | A1 * | 4/2013 | Mills | F25B 27/00 62/56 |
| 2015/0246733 | A1 | 9/2015 | Silet et al. | |

FOREIGN PATENT DOCUMENTS

| | | |
|---|---|---|
| EP | 2204319 A2 | 7/2010 |
| EP | 2 871 349 A1 | 5/2015 |
| EP | 2881329 A1 | 6/2015 |
| GB | 2436708 A | 10/2007 |
| KR | 20130058849 A | 6/2013 |
| WO | 2013/121139 A2 | 8/2013 |

OTHER PUBLICATIONS

Jan. 27, 2016 Search Report issued in British Patent Application No. 1513952.0.

* cited by examiner

AIRCRAFT PNEUMATIC SYSTEM

The present disclosure concerns an environmental control system for an aircraft.

Prior aircraft pneumatic systems are known comprising an environmental control system (ECS) powered by high pressure air provided by a bleed air system (BAS). Bleed air systems generally comprise cabin bleed offtakes which duct air from a compressor of a gas turbine engine for use in the aircraft pneumatic system, such as the ECS and wing de-icing. The ECS provides cabin air to the cabin interior at a required temperature, pressure and flow rate. The BAS system comprises a fan air heat exchanger which exchanges heat between relatively cool fan air provided by a fan air duct, and the relatively hot cabin bleed air provided from the engine compressor. Once cooled by the heat exchanger, the cabin bleed air is then passed to an air cycle machine of the ECS, where the cabin bleed air is processed to obtain the desired heat, pressure and flow rate, before being passed to the cabin of the aircraft. A portion of this air is then recycled, while the remainder is vented overboard via an outflow valve.

In some cases, low pressure and high pressure cabin bleed offtakes are provided, which are each supplied with compressed air from the low pressure compressor and the high pressure engine compressor respectively, or from lower and higher pressure stages respectively of a single engine compressor. It is generally desirable to extract bleed air from the low pressure bleed offtake (i.e. one near the front of the engine), since air taken from the low pressure bleed offtake has been compressed to a lesser extent compared to air taken from the high pressure bleed offtake. Consequently, a given mass of air bled from the low pressure bleed offtake represents a smaller energy loss to the thermodynamic cycle of the engine compared to the same mass of air taken from the high pressure bleed offtake, and so the specific fuel consumption (SFC) of the engine will be greater (i.e. more fuel will be burned for a given thrust) where air is bled from the high pressure bleed offtake. The bleed air system also typically comprises one or more handling bleed valves, which open in accordance with a schedule to control compressor operability. Air from the handling bleeds is immediately vented overboard without being further used.

However, current systems are non-optimal, in the sense that air from the high pressure offtake must be used to provide sufficient pressure and flow to the ECS at some engine conditions, such as when the engine is at low power. Consequently, at least one of the cabin bleed offtakes must be located at a relatively high pressure stage of the engine compressor, and must be utilised extensively during engine operations, particularly when the engine is operated at low thrust, and therefore low engine overall pressure. Such arrangements are relatively complex, and may result in excessive thrust specific fuel consumption (SFC), since the cabin bleed air must be provided at relatively high pressure in such prior arrangements. In some cases, the minimum thrust that can be achieved by the engine in flight (known as "flight idle thrust") is limited by the overall pressure ratio required to operate the ECS system. Consequently, in such circumstances, the engines are operated at a higher thrust than would be required for maintaining the desired flight profile and engine operability alone, thereby again resulting in increased SFC.

Accordingly, it is an object of the present invention to provide an environmental control system having improved efficiency.

According to the present invention there is provided an aircraft pneumatic system comprising:
a main gas turbine engine comprising a main compressor;
a recuperated auxiliary gas turbine engine comprising a core compressor having an inlet in fluid communication with a main compressor bleed of the main gas turbine engine; and
an environmental control system inlet in fluid communication with the main compressor bleed of the main gas turbine engine and comprising a compressor drivable by power provided by the auxiliary gas turbine engine.

It has been found that the above combination of features provides an environmental control system capable of reliably providing highly efficient pressurised air at a wide range of engine operating conditions and aircraft operating altitudes.

The auxiliary gas turbine engine core compressor inlet may be in direct fluid communication with the main compressor bleed of the main gas turbine engine, or may be in fluid communication with the main compressor bleed of the main gas turbine engine via a cabin air exhaust. Advantageously, pressurised, waste air from the aircraft cabin is utilised by the auxiliary gas turbine engine, thereby increasing auxiliary gas turbine engine efficiency without affecting main engine compressor operability.

The auxiliary gas turbine engine may comprise a variable area turbine. Advantageously, the inlet air requirement of the auxiliary gas turbine engine can be matched to the bleed air output of the main engine compressor.

The main gas turbine engine compressor may comprise a high pressure main compressor stage and a lower pressure main compressor stage. The main compressor may comprise a high pressure compressor and a low pressure compressor, each being driven independently by a respective turbine. The core compressor inlet of the auxiliary gas turbine engine may be in fluid communication with one or more of a lower pressure main compressor customer bleed port, a higher pressure main compressor customer bleed port, a fan outlet of the main gas turbine engine, and a compressor handling bleed port.

In one embodiment the system may comprise a valve selectable between a first position, in which at least one of the environmental control system inlet and the auxiliary gas turbine engine core compressor inlet is in fluid communication with the fan outlet of the gas turbine engine, and a second position in which at least one of the environmental control system inlet and the auxiliary gas turbine engine core compressor inlet is in fluid communication with a compressor bleed of the gas turbine engine main compressor.

The auxiliary gas turbine engine may further comprise a load driven by a turbine of the auxiliary gas turbine engine. The load may comprise at least one of an electrical generator, a load compressor, a main gas turbine engine fluid pump, a main gas turbine engine shaft, and an air cycle machine compressor.

The environmental control system may comprise an air cycle machine comprising, in fluid flow sequence, a compressor, a heat exchanger and a turbine, the compressor being drivable by the turbine. The auxiliary gas turbine load compressor may be configured to provide air to an inlet of the air cycle machine compressor. The system may comprise a selectable bypass arrangement configured to provide air to the air cycle machine compressor directly from the main gas turbine engine compressor when operated in a bypass mode, and from the auxiliary gas turbine load compressor when in a non-bypass mode. Where the auxiliary gas turbine engine comprises an electrical generator, the electrical generator may be electrically connectable to an electric motor, and the air cycle machine compressor may be drivable by the electric motor. The air cycle machine may comprise a first compressor driven by the motor, and a second compressor driven by the air cycle machine turbine.

The main gas turbine engine fluid pump may comprise one or more of a fuel pump, and oil pump and a hydraulic fluid pump.

The auxiliary gas turbine engine may be located within a main gas turbine engine nacelle. Alternatively, the auxiliary gas turbine engine may be located within an aircraft fuselage.

The auxiliary gas turbine engine may comprise a propelling exhaust nozzle, which may be located within the main gas turbine engine nacelle.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
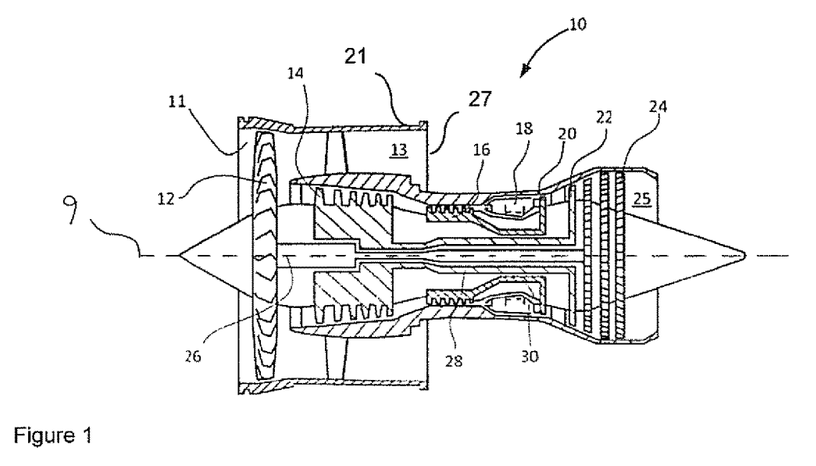
FIG. 1 is a sectional side view of a gas turbine engine.

With reference to FIG. 1, a main gas turbine engine is generally indicated at 10, having a principal and rotational axis 9. The engine 10 comprises, in axial flow series, an air intake 11, a propulsive fan 12, an intermediate pressure compressor 14, a high-pressure compressor 16, combustion equipment 18, a high-pressure turbine 20, and intermediate pressure turbine 22, a low-pressure turbine 24 and core and bypass exhaust nozzles 25, 27. A nacelle 21 generally surrounds the engine 10 and defines a bypass 13 and both the intake 11 and the exhaust nozzle 20.

The gas turbine engine 10 works in the conventional manner so that air entering the intake 11 is accelerated by the fan 12 to produce two air flows: a first air flow into the intermediate pressure compressor 14 and a second air flow which passes through the bypass duct 13 to provide propulsive thrust. The intermediate pressure compressor 14 compresses the air flow directed into it before delivering that air to the high pressure compressor 16 where further compression takes place.

The compressed air exhausted from the high-pressure compressor 16 is directed into the combustion equipment 18 where it is mixed with fuel and the mixture combusted. The resultant hot combustion products then expand through, and thereby drive the high, intermediate and low-pressure turbines 20, 22, 24 before being exhausted through the core nozzle 25 to provide additional propulsive thrust. The high 20, intermediate 22 and low 24 pressure turbines drive respectively the high pressure compressor 16, intermediate pressure compressor 14 and fan 12, each by suitable interconnecting shafts 30, 28, 26. The high pressure shaft 26 further drives a main gas turbine engine electrical generator 57. Consequently, the main gas turbine 10 provides primary motive power for an aircraft 1.

Figure 2:
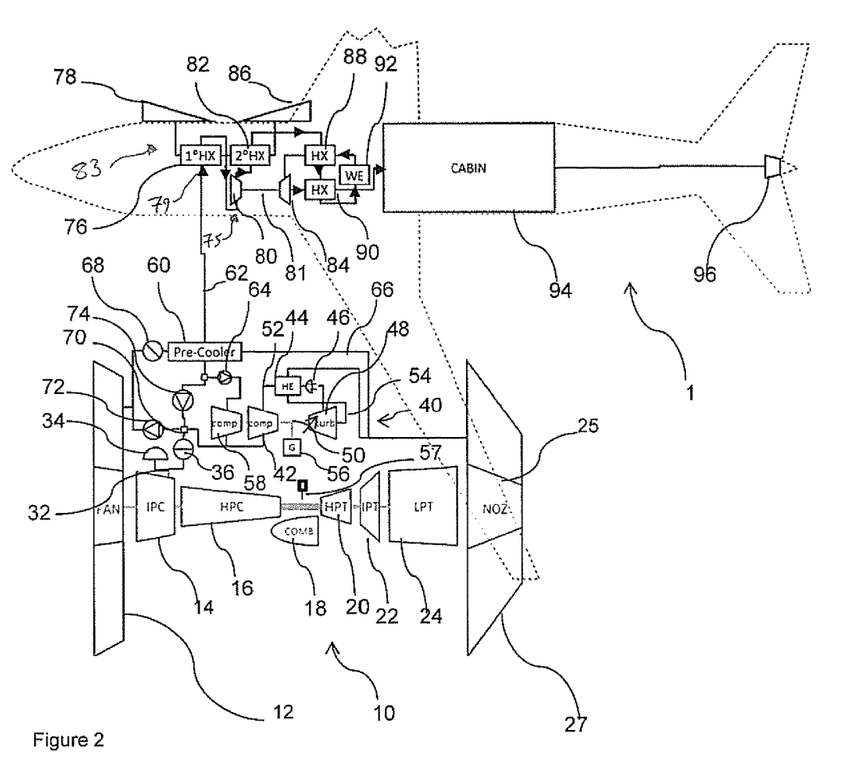
FIG. 2 is a schematic plan view of a first pneumatic system in accordance with the present disclosure.

FIG. 2 shows a first pneumatic system of the aircraft 1 in accordance with the present disclosure. The system 100 includes a gas turbine engine 10 similar to that of FIG. 1. The gas turbine engine comprises a first bleed offtake 32 in fluid communication with a compressor stage of the intermediate pressure compressor 14. The offtake supplies compressed air to both a handling bleed valve 34 and a customer bleed air valve 36 via a common manifold. The handling bleed valve 34 is operable in either fully open and fully closed positions, and is operated by a compressor handling schedule governed by an engine controller (not shown). An exhaust of the handling bleed valve 34 vents to the engine nacelle 21.

The customer bleed air valve 36 is operable between fully closed and fully open, as well as intermediate positions, and provides air downstream to a plurality of components. A first component supplied by the customer bleed air valve 36 is a recuperated auxiliary gas turbine engine generally indicated at 40. The auxiliary gas turbine engine comprises, in fluid flow sequence, a core compressor 42, a recuperator in the form of a heat exchanger 44, a combustor 46 and a turbine 48. The compressor 42 and turbine 48 are interconnected by a shaft 50, such that rotation of the turbine 48 drives the compressor 42, and the auxiliary gas turbine 40 consequently operates in a similar manner to the main gas turbine engine 10. The auxiliary gas turbine engine 40 is provided within the main engine 10 nacelle.

The turbine 48 is optionally a variable area turbine comprising variable inlet guide vanes (indicated by the arrow), which are adjustable to vary the inlet area of the turbine 48. Consequently, auxiliary gas turbine engine power output can be varied while maintaining a substantially fixed overall pressure ratio, by varying fuel flow and turbine 48 inlet area. Alternatively, airflow rate can be varied independently of engine 40 power output by varying the inlet area of the turbine 48. Operation in this manner is greatly advantageous in the present invention, for reasons outlined below.

The auxiliary gas turbine engine 40 is recuperated, as explained in detail below. The heat exchanger 44 comprise a first flow passage 52 in direct fluid flow communication with the core compressor 42 and combustor 46, and a second flow passage 54 which is in direct fluid flow communication with an outlet of the turbine 48 and an exhaust outlet. Consequently, fluid flowing through the auxiliary gas turbine 40 flows in series into the compressor 42, through the recuperator first fluid flow passage 52, through the combustor 46, through the turbine 54, through the recuperator second fluid flow passage 54, and out the exhaust. Consequently, waste heat from the auxiliary gas turbine exhaust is recycled prior to combustion, thereby increasing efficiency. In view of this arrangement, the fuel flow of the auxiliary gas turbine engine 40 is reduced for a given power output compared to a simple cycle gas turbine engine. Meanwhile, the auxiliary gas turbine engine 40 can operate at high efficiency with various constraints such as variable inlet temperature, pressure and flow rates as well as variable loads in view of the recuperation and/or variable area turbine. Airflow from the turbine 48 is exhausted to either the engine core nozzle 25 or the fan nozzle 27.

The auxiliary gas turbine engine 40 comprises at least one load. In this case, an electrical generator 56 and a load compressor 58 are provided. The electrical generator 56 comprises an alternating current (AC) electrical generator which is electrically coupled to aircraft and engine electrical loads such as fuel pumps, hydraulic fluid pumps, aircraft auxiliary systems, etc.

The load compressor 58 comprises an air compressor 58. The compressor 58 is provided with air from the customer bleed 32 via the customer bleed air valve 36, and is driven by the turbine 48 via the shaft 50. Consequently, the load compressor is driven by power provided by the auxiliary gas turbine engine 40. In alternative embodiments, the load compressor 58 could be driven by a separate auxiliary gas turbine engine turbine, which may be interconnected by a separate shaft. Such an arrangement is known as a "free power turbine", as the separate turbine does not drive a compressor of the engine core. An outlet of the air compressor 58 is provided to an inlet of an Environmental Control System (ECS) 79, as described in further detail below.

The system further comprises a manifold 70 having a first inlet provided with low pressure fan air via a first non-return valve 72, and a second inlet provided with high pressure from the main gas turbine engine intermediate pressure compressor 14 via the customer bleed air valve 36. The manifold 70 has a first output which provides air from either the first or second input to inlets of the auxiliary gas turbine engine core compressor 42 and load air compressor 58. A second output of the manifold 70 provides air from either the first or second input to the inlet of the ECS 79 via an air passage 62. The system is operable between a first mode, in which air is provided from the fan 12 outlet to the compressors 42, 58 inlets, a second mode, in which air is provided from the intermediate pressure compressor 14 to the compressors 42, 58 and a third mode, in which air is provided from the intermediate compressor 14 directly to the ECS inlet. Operation in accordance with the first, second and third modes is described in further detail below.

The ECS 79 comprises a pre-cooler heat exchanger 60. The pre-cooler 60 comprises a first flow passage 62 which is supplied with compressed air from either the load compressor 58 via a non-return valve 64 when the system is operating in either the first or second mode, or directly from the intermediate pressure compressor 14 via a non-return valve 74 and the customer bleed air valve 36 when the system is operated in the third mode. (when the selector valve 70 is in the third position). The pre-cooler 60 comprises a second flow passage 66 through which lower pressure, cooler air is provided from the fan 12 outlet via a flow control valve 68. The pre-cooler and flow control valve 68 allows the temperature of air flowing into the ECS 79 to be controlled.

The passage 62 leads to a first ECS heat exchanger 76 provided downstream, which exchanges excess between warm air within the passage 62 and cooler air provided from a ram air inlet 78 provided on an external surface of the aircraft fuselage or nacelle. Cooled air within the passage 62 is provided to an air cycle machine 75 downstream of the further heat exchanger 76. Air is directed through the air cycle machine 75, in fluid flow series, through an air cycle machine compressor 80, a second ECS heat exchanger in the form of an air cycle machine heat exchanger 82, a third heat exchanger 88, a fourth heat exchanger 90, a water extractor 92, back through the third heat exchanger 88, through an air cycle machine turbine 84, back through the fourth heat exchanger 90, and on to a cabin 94. Consequently, the air is first pressurised and thereby heated by the compressor 80. This heated air is cooled by the second heat exchanger 82 by exchanging heat in the compressed air with relatively cool air from the ram air inlet 78. This cooled air is then passed to the third and fourth heat exchangers, which cool the air such that humidity within the air condenses to be removed by the water extractor. The cooled air is then re-heated by passing through the fourth heat exchanger once more, before being cooled again by passing through the turbine 84, thereby driving the turbine 84, which in turn drives the compressor 80 via an interconnecting shaft 81. This cool air is used to warm air passing through the fourth heat exchanger on its first pass, thereby being warmed again before passing to the cabin 94.

As explained above, air is cooled by the air cycle machine 75, and passed to the aircraft cabin 94. A portion of the air from the cabin 94 is recycled through the air cycle machine 75, while the remainder is exhausted from the aircraft through an outflow valve 96, providing some thrust.

The system is operated as follows. The system may be operated in accordance with one of a first, second or third operating mode, depending on engine and aircraft operating conditions.

The system is generally operated in the first operating mode when the main gas turbine engine 10 is inoperative, such as during embarkation when on the ground. In the first operating mode, the bleed air valve is shut, such that air is provided only from the fan 12 outlet to the inlets of the auxiliary gas turbine engine core compressor 42 and the load compressor 58. Fuel is provided to the auxiliary gas turbine engine combustor 46, such that the auxiliary gas turbine engine 40 provides motive power, to thereby operate the load compressor 58. Compressed air from the load compressor 58 flows through the first flow passage 62 of the pre-cooler 60. The flow control valve 68 may be shut, thereby preventing flow from the fan 12 flowing through the pre-cooler 60, such that air entering the ECS 79 is not significantly cooled by the pre-cooler 60. One way valve 74 prevents fluid flow from re-entering the manifold 70 after being compressed by the load compressor 58, thus preventing recirculation. This air is then passed to the air-cycle machine, which operates as described above to regulate cabin air temperature and pressure. Meanwhile, the auxiliary gas turbine engine 40 also provides motive power to the electrical generator 56, thereby providing electrical power for the aircraft 1.

Once the main gas turbine engine 10 is started, the system may be operated in a second operating mode. The system is typically operated in the second operating mode when the intermediate pressure compressor 14 is operated at a low pressure ratio, such as during descent and taxiing. In the second operating mode, customer bleed air valve 36 is opened such that air is provided from intermediate pressure compressor 14 via the customer bleed air valve 36 to the inlets of the auxiliary gas turbine engine core compressor 42 and the load compressor 58. One way valve 72 prevents this flow from being lost to the fan inlet 72. Fuel is again provided to the auxiliary gas turbine engine combustor 46, such that the auxiliary gas turbine engine 40 provides motive power, to thereby operate the load compressor 58 and generator 56. Again, one-way valve 74 prevents flow recirculation. Compressed air from the load compressor 58 flows through the first flow passage 62 of the pre-cooler 60, and cooling air is provided through the second flow passage 66 from the nacelle 13. Fan air flow rate is controlled by valve 68 to provide a desired pre-cooler outlet temperature. This air is then passed to the air-cycle machine, which operates as described above to regulate cabin air temperature and pressure.

In the third operating mode, the bleed air valve 36 is opened, and air is provided from intermediate pressure compressor 14 via the customer bleed air valve 36 directly to the ECS pre-cooler 60, i.e. without being compressed by the load compressor 58. In this case, air is optionally provided to the auxiliary gas turbine engine 40, and so the load compressor 58 and the generator 56 are optionally operated. If the load compressor 58 is not operated, non-return valve 64 will operated to prevent air flow running backwards through the load compressor to the manifold 70, and thereby recirculating. Again, air is fed through the pre-cooler from the fan 12 outlet, with the flow rate being controlled by valve 68 to provide a desired pre-cooler outlet temperature. In this scenario, the system operates similarly to a conventional bleed air environmental control system, with air pressure being provided solely by the main gas turbine engine 10, and electrical power being provided by a main gas turbine engine electrical generator (not shown).

Consequently, the system can be operated in one of a first, second or third mode by varying the position of a single valve 36, and either operating or not operating the auxiliary gas turbine engine load compressor 58. Consequently, only a single variable valve is provided for switching between operating modes, which is one fewer than current systems employing high pressure and low pressure compressor bleeds and corresponding valves. Consequently, the system has reduced cost and complexity, and increased reliability.

Consequently, the system is highly flexible, providing three operating modes suitable for providing high efficiency ECS input air at different phases of flight. In general, the system is as efficient or more efficient than previous systems, while having the same or lower weight in view of the closer integration between the auxiliary and main gas turbine engines, and the deletion of the high pressure customer bleed.

A further benefit of the present invention is that, due to the provision of an inlet to the auxiliary gas turbine engine from the main gas turbine engine compressor bleed, a the auxiliary gas turbine engine can be operated under circumstances in which a conventional APU could not be (for example, at high altitude). Consequently, an increased safety factor can be provided, or one of the redundant electrical generators (normally at least two per engine are provided) could be deleted, thereby saving weight.

Figure 3:
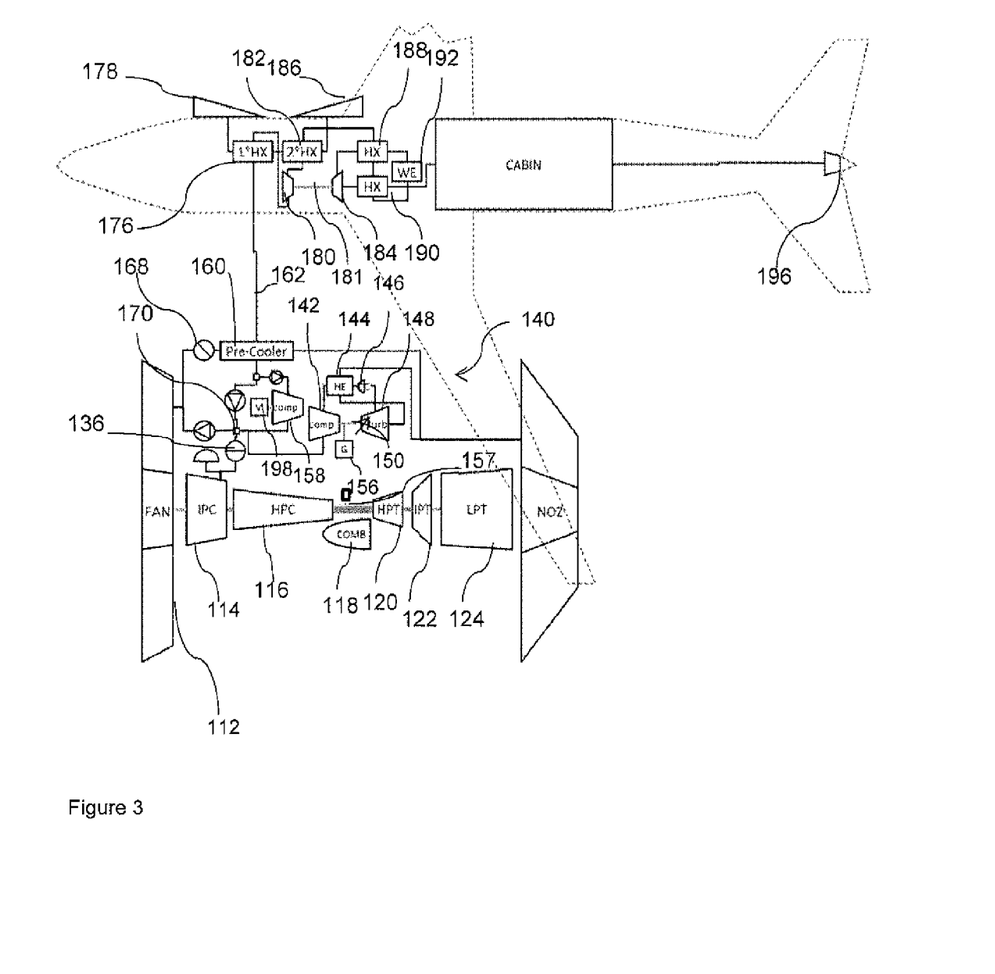
FIG. 3 is a schematic plan view of a second pneumatic system in accordance with the present disclosure.

FIG. 3 shows a second embodiment of the present disclosure. Similar parts are given corresponding reference numerals, incremented by 100. Again, a main gas turbine engine 110 is provided, having a fan 112, intermediate and high pressure compressors 114, 116, combustor 118, high, intermediate and low pressure turbines 120, 122, 124, and suitable interconnecting shafts. A recuperated auxiliary gas turbine 140 is provided, which is again similar to the auxiliary gas turbine engine 40, having a core compressor 142, heat exchanger 144, combustor 146 and turbine 154 interconnected by a shaft 150. However, in this case, no load compressor is coupled to the shaft 150, with only an electrical generator 156 being provided as a load to the auxiliary gas turbine engine 140.

The system further comprises an environmental control system pre-compressor 158, which performs a similar function to the load compressor 58, but is driven by an electrical motor 198 instead of the auxiliary gas turbine engine 140. The pre-compressor 158 is supplied with air from the intermediate pressure compressor 114 via a customer bleed valve 136, and provides compressed air to the pre-cooler 160. Again, air from the pre-cooler is supplied to the environmental control system downstream of the pre-cooler 160.

The system further comprises a manifold, through which air flows in accordance with first, second or third modes. In operation, when the system is operated in one of the first or second mode, air is supplied to both the auxiliary gas turbine engine 140 and the pre-compressor 158 (from the fan 112 in the first position, and from the intermediate pressure compressor 114 in the second position). The first mode is selected by closing the bleed valve 136, and the second mode is selected by opening the bleed valve 136. The pre-compressor 158 is driven by the electrical motor 198 to pre-compress air to a desired level to provide air to the ECS 79. In the third mode, the bleed valve 136 is opened, and the pre-compressor 158 is not operated. Consequently, air is provided to the ECS 79 directly from the main engine compressor 114. The electrical motor 198 can be operated either by electrical power provided by the generator 156 driven by the auxiliary gas turbine engine 156, or the electrical generator 157 driven by the main gas turbine engine 10. Consequently, this embodiment is more flexible than the first embodiment, since the compressor 158 is not dependent on operation of the auxiliary gas turbine engine. Furthermore, since there is no physical shaft between the auxiliary gas turbine 40 and the pre-compressor 158, these components do not have to be co-located, though the pre-compressor is preferably located within the main gas turbine engine nacelle.

The electric motor comprises a variable speed electric motor 198. Consequently, the pressure provided to the ECS 79 can be varied readily and accurately.

Figure 4:
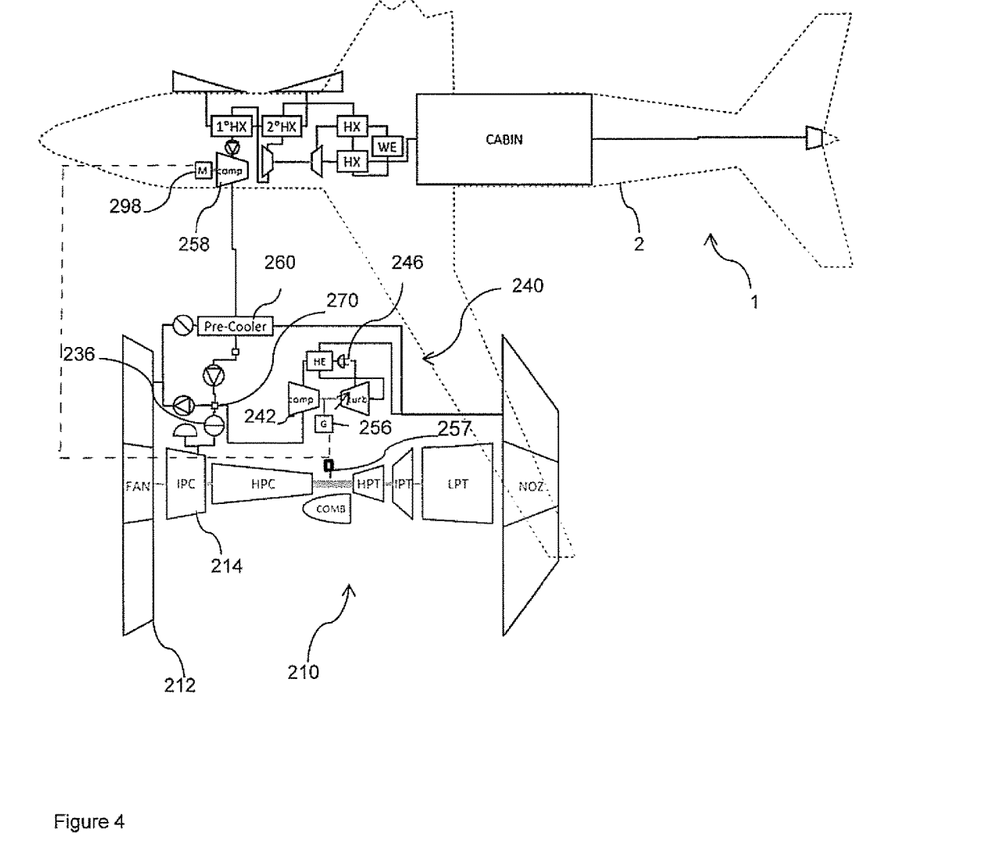
FIG. 4 is a schematic plan view of a third pneumatic system in accordance with the present disclosure.

FIG. 4 shows a third embodiment of the present disclosure having similar main 210 and auxiliary 240 gas turbine engines. This embodiment is similar to the second embodiment, having a pre-compressor 258 driven by an electric motor 298. However, in this case, the pre-compressor 258 is provided downstream of the pre-cooler 260, and is located within a fuselage 2 of the aircraft 1. Again, the pre-compressor 258 provides compressed air to downstream components of the ECS, in particular the air cycle machine. Again therefore, ECS inlet pressure can be modulated to an appropriate level by the pre-compressor 258 using electrical power from either the auxiliary gas turbine engine driven generator 256 or the main gas turbine engine generator 257. As shown by the dashed lines in FIG. 4, the electrical generator 256 is electrically connectable to the electric motor 298, which drives air cycle machine compressor 258.

Again, the system can be operated in one of a first, second and third operating mode. In a first operating mode, air is provided from the fan 212 to the ECS via a manifold 270 by closing a main engine compressor bleed valve 236 an operating the auxiliary gas turbine engine combustor 246. In this mode, air is also provided from the fan 212 to the auxiliary gas turbine engine core compressor 242 to provide air to the auxiliary gas turbine engine 240. In a second mode, selected by opening the bleed valve 236 and operating the combustor 246, air is provided from the intermediate compressor 214 to both the ECS and the auxiliary gas turbine engine core compressor 242. In the third mode, selected by opening the valve 236 and shutting down the combustor 246, air is provided from the intermediate pressure compressor 214 to the ECS only.

Figure 5:
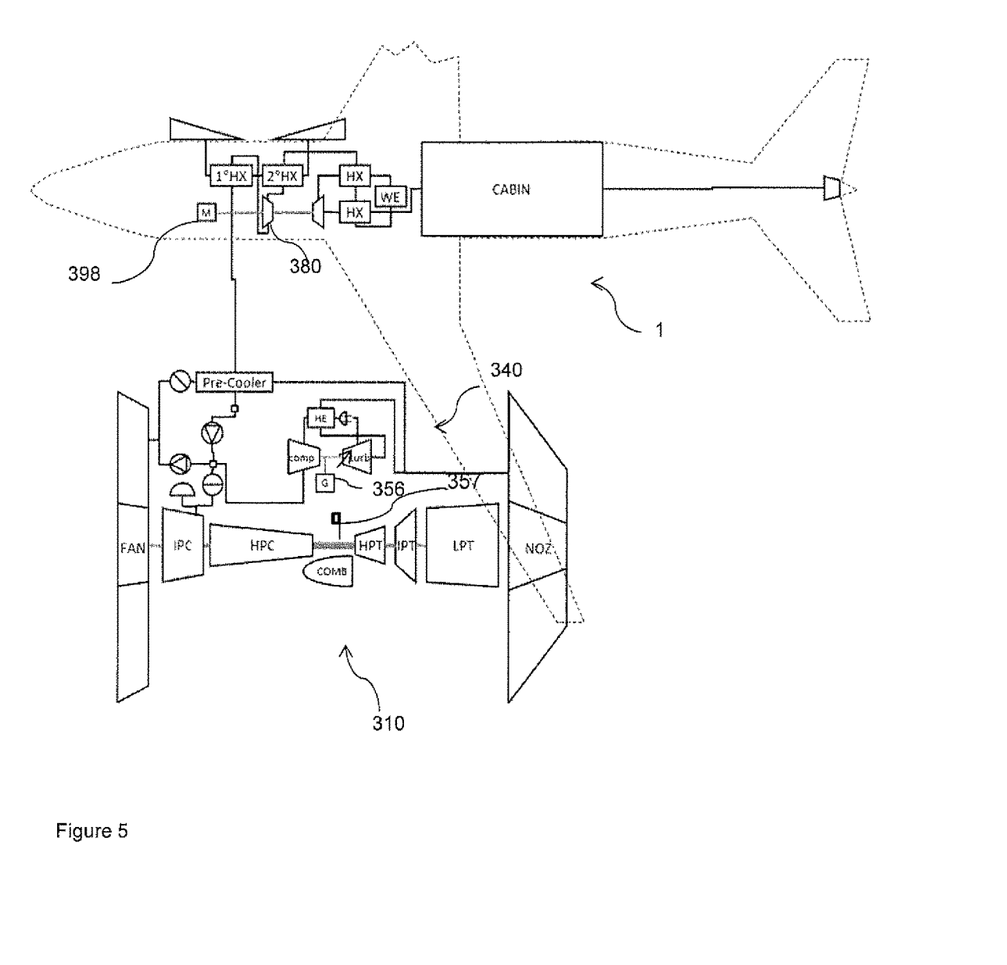
FIG. 5 is a schematic plan view of a fourth pneumatic system in accordance with the present disclosure.

FIG. 5 shows a fourth embodiment of the present disclosure, which is similar to the third embodiment, however in the fourth embodiment, the pre-compressor is omitted entirely. Instead, the air cycle machine compressor 380 is coupled to an electrical motor 398, which is in turn selectively provided with power from either the auxiliary gas turbine engine driven generator 356 or the main gas turbine engine driven generator 357.

The fourth embodiment is operated in accordance with first, second or third modes similar to those of the third embodiment, but with the air cycle machine compressor 380 being driven by the electrical motor 398 in place of the pre-compressor. Such an arrangement requires fewer modifications compared to previous versions, though the air cycle machine compressor may require modification.

Figure 6:
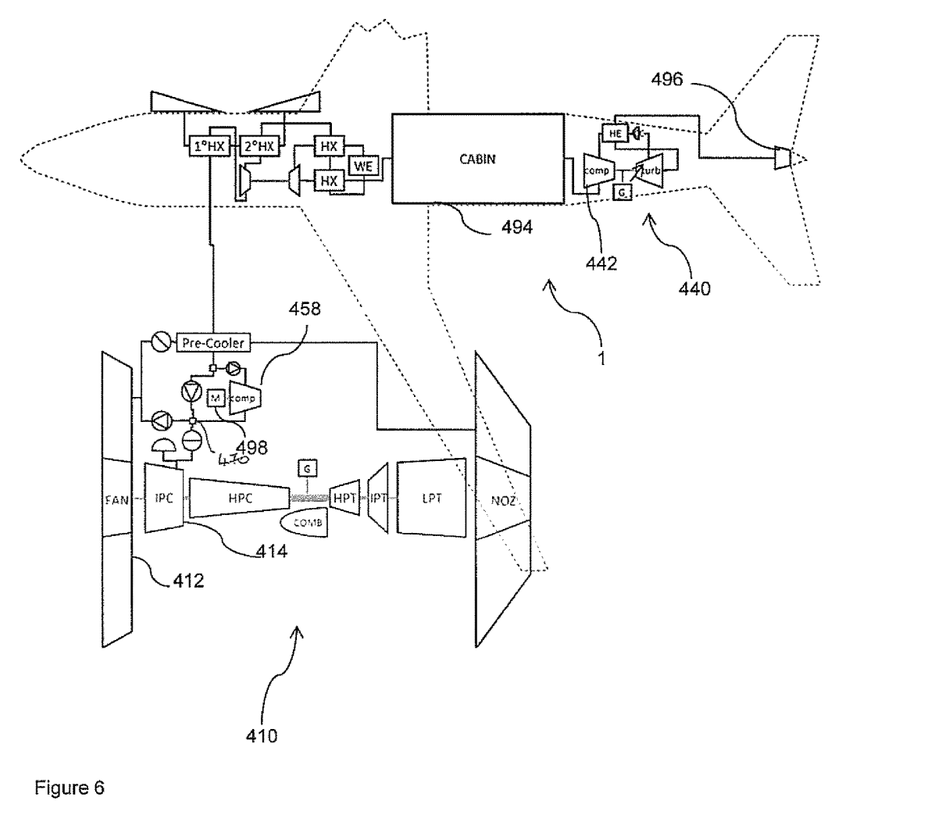
FIG. 6 is a schematic plan view of a fifth pneumatic system in accordance with the present disclosure.

FIG. 6 shows a fifth embodiment of the disclosure. In this embodiment, main and auxiliary gas turbines 410, 440 are provided, which are again similar to those in previous embodiments. A pre-compressor 458 is provided, which is located within the main gas turbine engine nacelle, and is selectively connected to the fan 412 and intermediate pressure compressor 412, 414 of the main gas turbine engine 410 and the ECS via a manifold 470. Again, the pre-compressor 458 can be supplied with air either from the fan 412 or main engine compressor 414.

The auxiliary gas turbine engine 440 is located within the fuselage 2 in this embodiment. An inlet of the auxiliary gas turbine engine core compressor 442 is provided within air from the cabin 494 after it has been exhausted, prior to be vented from the aircraft via the outflow valve 496. Consequently, air is supplied to the auxiliary gas turbine core compressor 442 indirectly from either the gas turbine engine fan 412 or the intermediate pressure compressor 414 via the cabin 494. Consequently, the pressurised air from the cabin 494 is utilised by the auxiliary gas turbine engine 440, thereby further raising the efficiency of the system as a whole. Since the pre-compressor 458 is in this case electrically driven by a motor 498, the auxiliary gas turbine engine 440 and pre-compressor 458 again do not have to be co-located.

Figure 7:
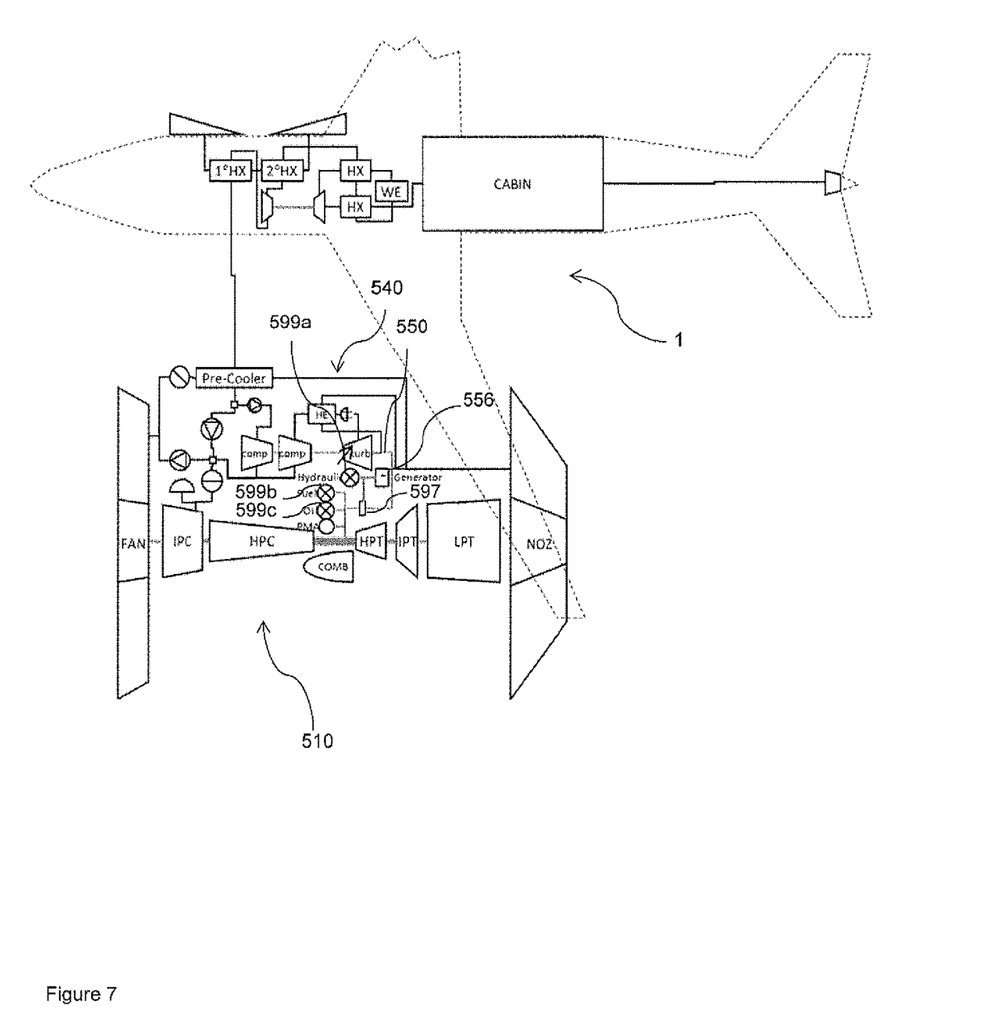
FIG. 7 is a schematic plan view of a sixth pneumatic system in accordance with the present disclosure.

FIG. 7 shows a sixth embodiment of the disclosure. The system shown in FIG. 7 is similar to that of FIG. 2, having a main engine 510 and auxiliary engine 540. However, the auxiliary engine is utilised to drive additional equipment in addition to the load compressor 558 and generator 556. The additional equipment includes main engine 10 fluid pumps including a main engine hydraulic pump 599a, fuel pump 599b and oil pump 599c. Each of the pumps 599a-c and the generator are driven by the auxiliary gas turbine engine shaft 550, via a gearbox 597. Consequently, the high efficiency of the auxiliary gas turbine engine 540 is utilised for a wider range of uses, thereby further reducing overall system fuel burn.

It will be understood that the invention is not limited to the embodiments above-described and various modifications and improvements can be made without departing from the concepts described herein.

For example, it will be appreciated that the disclosure is equally applicable to two shaft gas turbine engines, employing a fan and a low pressure compressor mounted to a common shaft, and a high pressure compressor mounted to a further shaft. The auxiliary gas turbine engine may mechanically drive the air cycle machine compressor. The electric generator and motor could be DC. The electric motor could be constant speed, with the speed of the driven load being varied by a variable speed gearbox such as a CVT, or the pressure or flow rate of the compressor could be varied by a bypass arrangement. The system could comprise a second, high pressure customer bleed for redundancy or further increased flexibility.

Except where mutually exclusive, any of the features may be employed separately or in combination with any other features and the disclosure extends to and includes all combinations and sub-combinations of one or more features described herein.

The invention claimed is:

1. An aircraft pneumatic system comprising:
a main gas turbine engine comprising a main compressor;
a recuperated auxiliary gas turbine engine comprising a core compressor, a combustor, and a recuperator, the core compressor including an inlet in fluid communication with a main compressor bleed of the main gas turbine engine, and the recuperator including a heat exchanger that is configured to recycle waste heat from an exhaust of the recuperated auxiliary gas turbine engine to an auxiliary gas turbine engine flow prior to the combustor; and
an environmental control system inlet in fluid communication with the main compressor bleed of the main gas turbine engine, the environmental control system inlet comprising a compressor drivable by power provided by the recuperated auxiliary gas turbine engine.

2. The system in accordance with claim 1, wherein the inlet of the core compressor is in direct fluid communication with the main compressor bleed of the main gas turbine engine.

3. The system in accordance with claim 1, wherein the inlet of the core compressor is in fluid communication with the main compressor bleed of the main gas turbine engine via a cabin air exhaust.

4. The system according to claim 1, wherein the recuperated auxiliary gas turbine engine comprises a variable area turbine.

5. The system according to claim 1, wherein the inlet of the core compressor is in fluid communication with one or more of a lower pressure main compressor customer bleed port, a higher pressure main compressor customer bleed port, a fan outlet of the main gas turbine engine, and a compressor handling bleed port.

6. The system according to claim 1, further comprising a valve moveable between a first position, in which at least one of the environmental control system inlet and the inlet of the core compressor is in fluid communication with a fan outlet of the main gas turbine engine, and a second position in which at least one of the environmental control system inlet and the inlet of the core compressor is in fluid communication with a compressor bleed of the main compressor.

7. The system according to claim 1, wherein the recuperated auxiliary gas turbine engine comprises a load driven by a turbine of the recuperated auxiliary gas turbine engine, the load comprising at least one of an electrical generator, a load compressor, a main gas turbine engine fluid pump, a main gas turbine engine shaft, and an air cycle machine compressor.

8. The system according to claim 7, wherein the load compressor is configured to provide air to an inlet of the air cycle machine compressor.

9. The system according to claim 8, wherein the system comprises a selectable bypass arrangement configured to provide air to the air cycle machine compressor directly from the main gas turbine engine compressor when operated in a bypass mode, and from the load compressor when in a non-bypass mode.

10. The system according to claim 7, wherein the electrical generator is electrically connectable to an electric motor and the air cycle machine compressor is drivable by the electric motor.

11. The system according to claim 10, wherein the air cycle machine comprises a first compressor driven by the electric motor, and a second compressor driven by the air cycle machine turbine.

12. The system according to claim 1, wherein the environmental control system comprises an air cycle machine comprising, in fluid flow sequence, a compressor, a heat exchanger and a turbine, the compressor being drivable by the turbine.

13. The system according to claim 1, wherein the recuperated auxiliary gas turbine engine is located either within a main gas turbine engine nacelle or within an aircraft fuselage.

14. The system according to claim 13, wherein the recuperated auxiliary gas turbine engine comprises a propelling exhaust nozzle, which is located within the main gas turbine engine nacelle.

15. An aircraft pneumatic system comprising:
a main gas turbine engine comprising a main compressor;
a recuperated auxiliary gas turbine engine comprising a core compressor, a combustor, and a recuperator, the core compressor including an inlet in fluid communication with a main compressor bleed of the main gas turbine engine, and the recuperator including a heat exchanger that is configured to recycle waste heat from an exhaust of the recuperated auxiliary gas turbine engine to an auxiliary gas turbine engine flow prior to the combustor;
an environmental control system inlet in fluid communication with the main compressor bleed of the main gas turbine engine, the environmental control system inlet comprising a compressor drivable by power provided by the recuperated auxiliary gas turbine engine; and
a pre-cooler that provides pre-cooled air to be combined with an air flow from the recuperated auxiliary gas turbine engine.

16. An aircraft pneumatic system comprising:
a main gas turbine engine comprising a main compressor;
a recuperated auxiliary gas turbine engine comprising a core compressor, a recuperator, and a turbine, the core compressor including an inlet in fluid communication with a main compressor bleed of the main gas turbine engine, the recuperator including a heat exchanger having a first recuperator flow passage and a second recuperator flow passage, the recuperator being arranged such that fluid flows in series into the core compressor, through the recuperator first fluid flow passage, through a combustor, through the turbine, through the recuperator second fluid flow passage, and out an exhaust, such that exhaust heat downstream of the turbine is transferred to combustor inlet air; and
an environmental control system inlet in fluid communication with the main compressor bleed of the main gas turbine engine, the environmental control system inlet comprising a compressor drivable by power provided by the recuperated auxiliary gas turbine engine.

* * * * *